United States Patent [19]

Matsumoto et al.

[11] Patent Number: 5,666,717
[45] Date of Patent: Sep. 16, 1997

[54] METHOD FOR MANUFACTURING A MAGNETIC HEAD SUSPENSION

[75] Inventors: Hirofumi Matsumoto; Mitsunobu Shoumura; Norimasa Fujita; Masaichi Inaba, all of Ushiku; Yasuyuki Tanaka, Tsuchiura, all of Japan

[73] Assignee: Nippon Mektron, Ltd., Tokyo, Japan

[21] Appl. No.: 465,756

[22] Filed: Jun. 6, 1995

[30] Foreign Application Priority Data

Jul. 27, 1994 [JP] Japan .................. 6-194945

[51] Int. Cl.⁶ .................. G11B 5/127
[52] U.S. Cl. .................. 29/603.12; 29/603.23; 360/104
[58] Field of Search .................. 29/603.07, 603.12, 29/603.13, 846, 848, 849, 603.23; 360/104, 103; 439/77

[56] References Cited

U.S. PATENT DOCUMENTS

| | | | |
|---|---|---|---|
| 4,645,280 | 2/1987 | Gordon et al. | 439/77 |
| 5,185,683 | 2/1993 | Oberg et al. | 360/104 |
| 5,454,158 | 10/1995 | Fontana, Jr. et al. | 29/603.07 |
| 5,528,819 | 6/1996 | McKay et al. | 29/603.07 |

*Primary Examiner*—Larry I. Schwartz
*Assistant Examiner*—Khan Nguyen
*Attorney, Agent, or Firm*—Chilton, Alix & Van Kirk

[57] ABSTRACT

A method of manufacturing a magnetic head suspension assembly, wherein a wiring member for connecting a magnetic head element with a read/write amplifier circuit board is integrally formed with the suspension which includes the steps of (1) forming a flexible insulating base material on one surface of a springy metal layer by using a non-photosensitive polyimide resin layer or a photosensitive insulating resin layer; (2) producing a circuit wiring pattern on the top of the flexible insulating base material by plating and by using an electrically conductive metal thin film; (3) for forming a surface protecting layer on the surface of the circuit wiring pattern; (4) the springy metal layer; and (5) bending the springy metal layer to form a desired suspension.

20 Claims, 4 Drawing Sheets

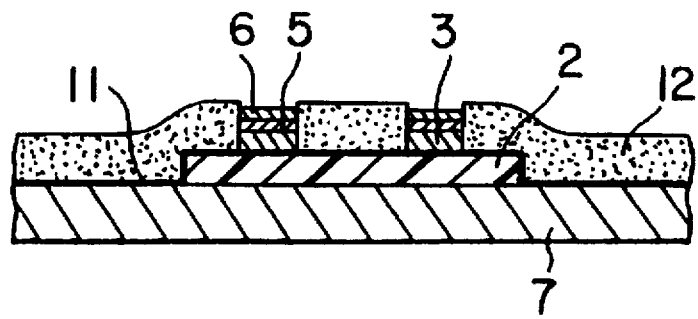
FIG. 3F
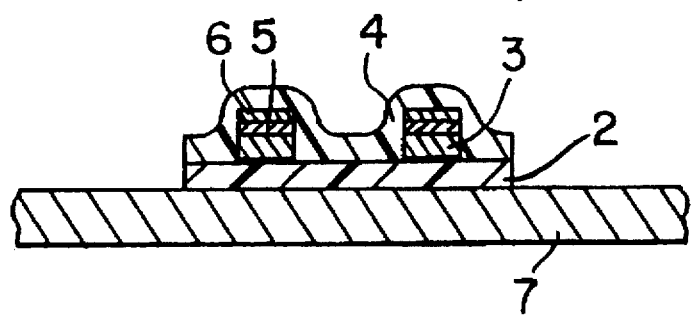
FIG. 3G
FIG. 3H
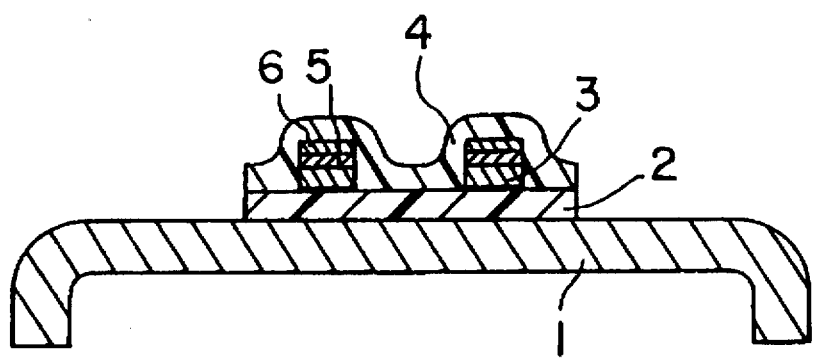
FIG. 3I

METHOD FOR MANUFACTURING A MAGNETIC HEAD SUSPENSION

BACKGROUND OF THE INVENTION

1. Field of the Invention

The present invention generally relates to a method for manufacturing a magnetic head suspension assembly used for a magnetic disk unit or the like. More particularly, the present invention relates to a method for manufacturing a magnetic head suspension assembly wherein a wiring member for connecting a magnetic head element with a read/write amplifier circuit board is integrally formed with a suspension.

2. Description of the Related Art

Magnetic disk units of the type with which the present invention is suited for use are equipped with at least one rotary disk for magnetically recording information, a magnetic head element, for reading from or writing to tracks on the disk, and a head positioning actuator which is connected with the head element. The positioning actuator is used to move the head element to a desired track and maintain the head element above the selected track.

An example of a conventional magnetic head suspension assembly is disclosed in published Japanese Patent Application No. 63-113917. In this art, the magnetic head element is attached to a flexure by epoxy resin or the like and the flexure is installed on a load beam by laser welding or the like. Gold-plated copper lead wire provided with urethane coating or the like is connected by ultrasonic bonding, soldering, or the like to electrodes on the magnetic head element, thus forming a leader wiring section for sending a signal from the magnetic head to an external circuit. The wiring member is turned a number of times before it is housed in a flexible insulating resinous tube, and mounted on the suspension by crimping a part of the suspension or other similar means.

The above-identified prior art magnetic head suspension assembly suffers from the problem that forming the connection between an electrode on the magnetic head element and the leader wiring is extremely inefficient due to restrictions on operability, making it difficult to achieve higher productivity. This problem has been exacerbated by the increasing number of terminals resulting from the reduced sizes of magnetic head elements and the increasing use of MR elements in recent years. Furthermore, an additional problem arises because the rigidity of the leader wiring member prevents the magnetic head element from obtaining an optimum position when it floats. A final problem with this prior art suspension is that the leader wiring member is subjected to wind pressure from air flow produced by a rotating recording medium, which disturbs the position of a floating magnetic head element.

In an attempt to solve the above-discussed problems, as shown in published Japanese Patent Application No. 53-74414, it has been proposed to employ a flexible circuit board, which serves as the leader wiring member and the suspension mechanism, to support the magnetic head element. This approach however, presents many problems in achieving accurate positioning, applying the appropriate load, and achieving the appropriate floating position of the magnetic head element.

As another approach to solving the problems discussed above which are associated with conventional leader wiring, a flexible circuit board, which includes all wiring, is attached to a suspension spring with an adhesive agent or the like.

This approach, however, unavoidably trades-off weight reduction for operability because a separate flexible circuit board must be glued to the suspension spring. This is contrary to the principal that a member which serves as a servo mechanical element should be as light weight as possible to meet the demand for faster seek, etc.

Hence, there has been a demand for a magnetic head suspension assembly which reduces the adverse influences on the floating position of the magnetic head exerted by the leader wiring member and also permits easier mounting of the magnetic head element,these improvements being achieved by combining the leader wiring member and the suspension into one piece.

SUMMARY OF THE INVENTION

It is, accordingly, an object of the present invention to provide a method of manufacturing a magnetic head suspension assembly which allows a leader wiring member and a suspension to be combined into a single magnetic head unit.

To this end, the present invention provides a method of manufacturing a magnetic head suspension assembly which includes the steps of: (1) forming a flexible insulating base material layer having a desired shape on one surface of a springy (i.e. resilient), metal layer; (2) cladding an electrically conductive metal thin film uniformly on an exposed surface of the springy metal layer and the exposed surface of the flexible insulating base material layer located on the same side of the metal layer; (3) forming a resist pattern on the surface of the electrically conductive metal thin film which has been cladded to the surface of the flexible insulating base material layer and the springy metal to form a reversal pattern of a desired circuit wiring pattern on the top of the flexible insulating base material layer; (4) plating the electrically conductive metal thin film exposed in the reversal pattern area to produce the desired circuit wiring pattern; (5) removing the resist pattern from the surface of the electrically conductive metal thin film; (6) etching the exposed area of the electrically conductive metal thin film; (7) forming a surface protecting layer on the surface of the circuit wiring pattern by photofabrication process which employs a photosensitive insulating resin; (8) photoetching the springy metal layer; and (9) bending the springy metal layer into a predetermined shape to produce a suspension having a desired shape.

The step of forming the flexible insulating base material layer on one surface of a springy metal layer includes the steps of (1) forming a laminated plate comprising the springy metal layer, i.e., a resilient layer which may function as a spring having a non-photosensitive polyimide layer made of a soluble polyimide or a polyimide precursor on one surface and a photosensitive resist layer on the top surface of the non-photosensitive polyimide layer; (2) producing a resist pattern which matches the desired shape of the flexible insulating base material layer by exposing and developing the photosensitive resist layer; (3) etching the area of the non-photosensitive polyimide layer which is accessible via the resist pattern; (4) removing the resist pattern; and (5) curing the remaining non-photosensitive polyimide layer to produce the desired flexible insulating base material layer.

An alternative process for forming the flexible insulating base material layer on one surface of a springy metal layer includes the steps of (1) preparing a laminated plate comprising a springy metal layer and, on one surface of the springy metal layer, providing a photosensitive insulating resin layer comprising a photosensitive polyimide, photosensitive epoxy resin, or a photosensitive acrylic resin; (2) exposing and developing the photosensitive insulating resin layer to form an insulating base material layer of a desired shape; and (3) curing the insulating base material layer to produce the desired flexible insulating base material layer.

In the aforementioned process, the electrically conductive metal thin film can be formed and clad by sputtering, vacuum deposition, or ion plating. After the circuit wiring pattern is produced, the surface of the circuit wiring pattern should be plated to form a corrosion resistant metal layer.

BRIEF DESCRIPTION OF THE DRAWINGS

FIG. 3a through FIG. 3i illustrate one embodiment of the method of manufacturing the magnetic head suspension assembly of the present invention and;

DESCRIPTION OF THE PREFERRED EMBODIMENTS

Figure 1:
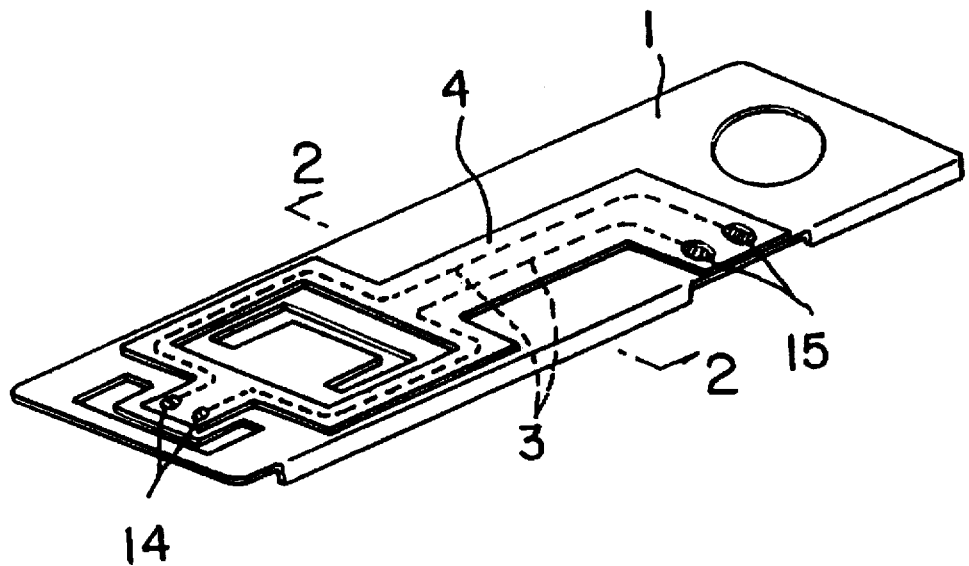
FIG. 1 is a conceptual perspective view showing a magnetic head suspension produced by a manufacturing method in accordance with the present invention.

FIG. 1 is a schematic representation of a magnetic head suspension assembly produced by practice of the present invention. In the magnetic head suspension assembly shown in FIG. 1, the wiring member for connecting a magnetic head element with a read/write amplifier circuit board and the suspension are combined into one piece.

According to the embodiment of the magnetic head suspension shown in FIG. 1, the flexible insulating base material and a circuit wiring pattern 3, which is formed on the insulating base material and covered with a surface protecting layer 4, are formed into one piece on a suspension 1 made of springy metal.

In the embodiment shown in FIG. 1, holes are formed in predetermined positions of the surface protecting layer 4 to make the connecting terminal section for the magnetic head element. The holes expose a part of the circuit wiring pattern 3 which can be coated with layer of solder, gold, or the like to form connecting terminals 14. An end of the suspension 1 has terminals 15 for external connection which are formed in the same manner.

Figure 2:
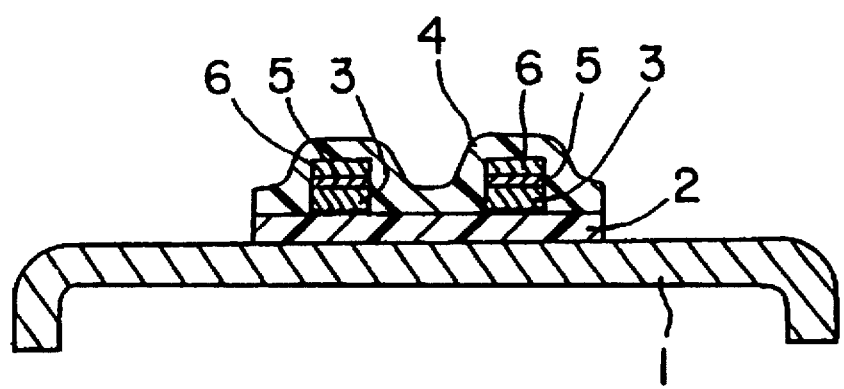
FIG. 2 is a conceptual cross-sectional block diagram taken along line 2—2 of FIG. 1.

FIG. 2 is a cross-sectional view taken along line A—A of FIG. 1. In FIG. 2, reference numeral 1 denotes a suspension made of springy metal such as stainless steel. A predetermined surface area of the suspension 1 is covered with the flexible insulating base material 2 made of polyimide, epoxy resin, acrylic resin, or the like. The desired circuit wiring pattern 3 is formed on the surface of the flexible insulating base material 2. Reference numerals 5 and 6 denote a base plating layer of nickel or the like and a corrosion resistant metal layer of gold or the like, respectively, which are formed on the surface of the circuit wiring pattern 3. The circuit wiring pattern 3, which is provided with the base plating layer 5 and the corrosion resistant metal layer 6, is further provided with a surface protecting layer 4 composed of a photosensitive insulating resin or the like.

FIG. 3a through 3i illustrate one of the methods of manufacturing a magnetic head suspension assembly in accordance with the present invention. The manufacturing process is represented and explained by views taken along line 2—2 of FIG. 1.

Figure 3A:
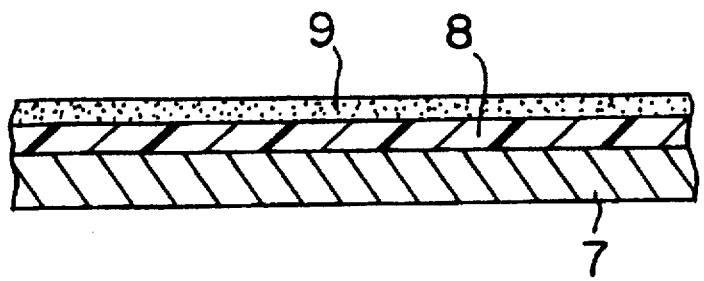
Figure 3B:
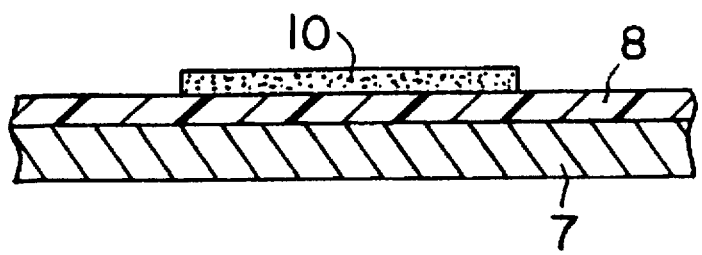
Figure 3C:
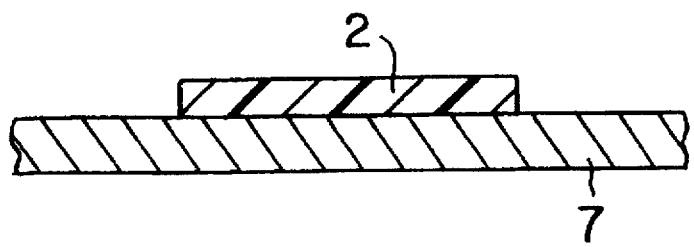

In FIG. 3a, a laminated plate is formed. The laminated plate has a springy metal layer 7, which is made of stainless steel or the like, for forming the suspension, a non-photosensitive polyimide layer 8 (10 to 50 μm thick) made of a polyimide precursor on one surface of the springy metal layer, and a photosensitive resist layer 9 on the top surface of the non-photosensitive polyimide layer 8. One material suitable for the non-photosensitive polyimide layer 8 is a polyimide precursor called SFP which is made by SHIN-NITTETSU KAGAKU. Alternatively, other materials, such as a soluble polyimide, may be used for the non-photosensitive polyimide layer 8.

The photosensitive resist layer 9 is subjected to an exposure process and a resist development process using 0.5% lactic acid to produce a resist pattern 10 which matches the shape of the desired flexible insulating base material.

The exposed area of the non-photosensitive polyimide layer 8 is, then, etched and removed using 10% potassium hydroxide, and the resist pattern 10 is removed using 10% malic acid. In the next step, the remaining nonphotosensitive polyimide layer is subjected to gradual curing (e.g., 15 minutes at 130° C., 2 minutes at 160° C., 2 minutes at 200° C., and 2 minutes at 270° C.) to produce the desired flexible insulating base material 2 shown in FIG. 3c.

Figure 3D:
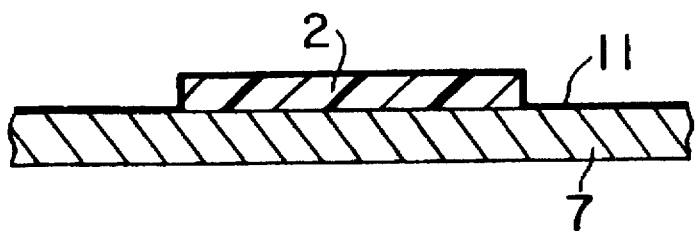
Figure 3E:
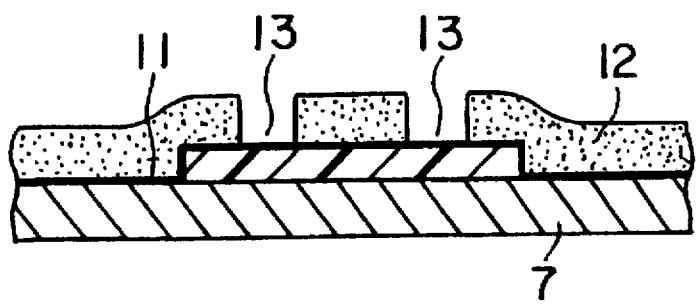

Then, as shown in FIG. 3d, an electrically conductive metal thin film 11 is uniformly formed on the outer surface of the flexible insulating base material 2 and the exposed surface of the springy metal layer 7. The metal thin film may be formed by sputtering, vacuum deposition, or ion plating. In the following step, a photoresist composed of PMER made by TOKYO OHKA K.K. is applied to the surface of the electrically conductive metal thin film 11. Then, the photo resist material is subjected to exposure and development to make a resist pattern 12 which is about 10 μm thick and which forms a reversal pattern 13 of the desired circuit wiring pattern on the top of the flexible insulating base material 2.

Next, as illustrated in FIG. 3f, the circuit wiring pattern 3 is formed by copper plating the electrically conductive metal thin film 11. Here the metal thin film 11 is used as an electrode and electrolytic plating is carried out in a copper sulfate plating bath. This results in a copper plating of about 5 μm thickness adhering to the surface of the electrically conductive metal thin film 11 in the region of the reversal pattern 13. Further, electrolytic nickel plating and gold plating are used to form the 0.1 um-thick base plating layer 5 and the 1 μm-thick corrosion resistant metal layer 6, respectively, on the surface of the circuit wiring pattern 3. Forming the corrosion resistant metal layer 6 at this stage eliminates the need to plate the terminal of the circuit wiring pattern 3, with the corrosion resistant metal layer of gold plating or the like at the last stage.

As shown in FIG. 3g, the resist pattern 12 is removed with acetone. Then, the unwanted portion of the electrically conductive metal thin film 11 is etched and removed using a soft etching agent, such as MECKBRIGHT made by MECK K.K., to form the desired circuit wiring pattern 3. Thus, the circuit wiring pattern 3, with the corrosion resistant metal layer 6 disposed over the base plating layer 5, is located on the top of the flexible insulating base material 2.

In the following step, as illustrated in FIG. 3h, a photosensitive soluble polyimide composed of LITHOCOAT made by Ube Industries, Ltd. is applied over the circuit wiring pattern 3. The coating is then subjected to exposure, development, and post baking for 30 minutes at 230° C., thereby producing a surface protecting layer 4 which has an opening in a predetermined section such as the terminal section.

Lastly, as illustrated in FIG. 3i, the springy metal layer 7 is photoetched and bent into a predetermined shape to produce the suspension 1. This completes the production of the magnetic head suspension with integral circuit wiring.

Figure 4A:
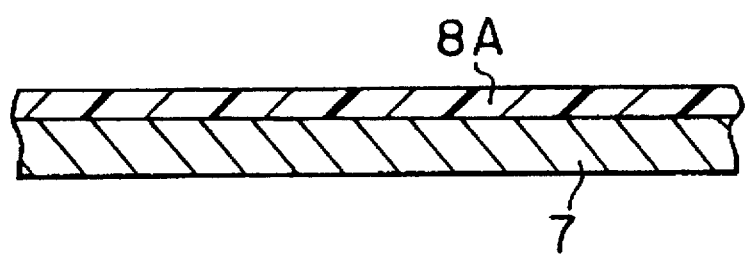
FIG. 4a and FIG. 4b illustrate one method of forming a desired flexible insulating base material on a springy metal layer according to the present invention.
Figure 4B:
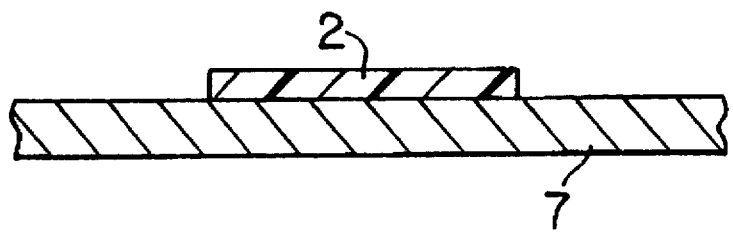

FIG. 4a and FIG. 4b show the manufacturing processes of forming the flexible insulating base material 2 on one surface of the springy metal layer 7 according to another embodiment of the present invention. As illustrated in FIG. 4a, this embodiment employs a laminated plate which has a photosensitive insulating resin layer 8A, made of a photosensitive polyimide, photosensitive epoxy resin, a photosensitive acrylic resin, or the like, on one surface of the springy metal layer 7.

The photosensitive insulating resin layer 8A of the laminated plate is exposed, developed and cured to form the flexible insulating base material 2 having a desired shape on one surface of the springy metal layer 7 as shown in FIG. 4b. Then, steps FIGS. 3d through 3i are performed to produce a single magnetic head suspension combined with circuit wiring as in the embodiment described above.

The method of manufacturing the magnetic head suspension assembly of the present invention employs a sheet type laminated plate having a springy metal layer wherein a non-photosensitive polyimide and a photosensitive resist layer are combined into one piece. Alternatively, a sheet type laminated plate composed of the springy metal layer which is combined with the photosensitive insulating resin into one piece can be employed. This greatly simplifies the process, and hence reduces the cost, of producing the flexible insulating base material of a desired configuration on the springy metal layer.

Further, since the flexible insulating base material employs a non-photosensitive polyimide or a photosensitive insulating resin, the flexible insulating base material can be easily formed into a desired configuration using a mild chemical instead of a hazardous chemical such as hydrazine.

In addition, the surface protecting layer which is formed on the surface of the circuit wiring pattern can be readily produced using material which can be easily cured at low temperature.

In conclusion, the methods of manufacturing a magnetic head suspension of the present invention make it possible to reliably provide a magnetic head suspension with integrated circuit wiring, the suspension being capable of achieving improved operability and reduced weight while at the same time ensuring the accurate positioning, application of appropriate load, and appropriate floating position of the magnetic head element as required of a suspension.

What is claimed is:

1. A method of manufacturing a magnetic head suspension assembly comprising the steps of:

providing a metal member which is to form a resilient suspension for a magnetic head, said metal member having a pair of opposed surfaces;

forming a layer of a flexible insulating base material having a desired shape on selected portions of one surface of said metal member whereby a portion of said one surface of said metal member is exposed;

cladding an electrically conductive metal thin film on said exposed portion of said one surface of said metal member and on the surface of said flexible insulating base material layer;

forming a resist pattern on selected portions of the surface of said electrically conductive metal thin film, said resist pattern comprising areas where said surface of said conductive metal film is uncovered and areas where said surface of said conductive metal film is covered by the resist material, said uncovered areas defining a circuit wiring pattern;

plating said electrically conductive metal thin film with electrically conductive material in said uncovered areas to produce the conductors of the circuit wiring pattern;

removing said resist pattern and the unplated portions of said electrically conductive metal thin film;

forming a surface protecting layer on, at least, the surface of said conductors of said circuit wiring pattern; and shaping said metal member to form a suspension element integrated with the circuit wiring pattern.

2. A method of manufacturing a magnetic head suspension assembly according to claim 1, wherein said step of forming said flexible insulating base material layer comprises the steps of:

forming a non-photosensitive polyimide layer on one surface of said metal member;

forming a photosensitive resist layer on the surface of said non-photosensitive polyimide layer;

producing a resist pattern which matches the desired shape of said flexible insulating base material layer by selectively removing said photosensitive resist layer to thereby uncover a portion of said surface of said non-photosensitive polyimide layer;

removing said uncovered portion of said non-photosensitive polyimide layer;

removing said resist pattern from the remaining portion of said non-photosensitive polyimide layer; and curing the remaining portion of said non-photosensitive polyimide layer.

3. A method of manufacturing a magnetic head suspension assembly according to claim 1, wherein said step of cladding said electrically conductive metal thin film comprises sputtering.

4. A method of manufacturing a magnetic head suspension assembly according to claim 2, wherein said step of cladding said electrically conductive metal thin film comprises sputtering.

5. A method of manufacturing a magnetic head suspension assembly according to claim 1, further comprising the step of forming a corrosion resistant metal layer on the surface of said conductors of said circuit wiring pattern by plating.

6. A method of manufacturing a magnetic head suspension assembly according to claim 2, further comprising the step of forming a corrosion resistant metal layer on the surface of said conductors of said circuit wiring pattern by plating.

7. A method of manufacturing a magnetic head suspension assembly according to claim 2, wherein said non-photosensitive polyimide layer is a soluble polyimide.

8. A method of manufacturing a magnetic head suspension assembly according to claim 2, wherein said non-photosensitive polyimide layer is a polyimide precursor.

9. A method of manufacturing a magnetic head suspension assembly according to claim 2, wherein said step of cladding said electrically conductive metal thin film comprises vacuum deposition.

10. A method of manufacturing a magnetic head suspension assembly according to claim 2, wherein said step of cladding said electrically conductive metal thin film comprises ion plating.

11. A method of manufacturing a magnetic head suspension assembly according to claim 1, wherein said step of forming said flexible insulating base material layer comprises:

forming a photosensitive insulating resin layer on one surface of said metal member;

removing selected portions of said photosensitive insulating resin layer; and curing the remaining portions of said photosensitive insulating resin layer.

12. A method of manufacturing a magnetic head suspension assembly according to claim 11, wherein said photosensitive insulating resin layer is a photosensitive polyimide.

13. A method of manufacturing a magnetic head suspension assembly according to claim 11, wherein said photosensitive insulating resin layer is a photosensitive epoxy resin.

14. A method of manufacturing a magnetic head suspension assembly according to claim 11, wherein said photosensitive insulating resin layer is a photosensitive acrylic resin.

15. A method of manufacturing a magnetic head suspension assembly according to claim 11, wherein said step of cladding said electrically conductive metal thin film comprises sputtering.

16. A method of manufacturing a magnetic head suspension assembly according to claim 11 further comprising the step of:

forming a corrosion resistant metal layer on the surface of said conductors of said circuit wiring pattern by plating.

17. A method of manufacturing a magnetic head suspension assembly according to claim 11, wherein said step of cladding said electrically conductive metal thin film comprises vacuum deposition.

18. A method of manufacturing a magnetic head suspension assembly according to claim 11, wherein said step of cladding said electrically conductive metal thin film comprises ion plating.

19. A method of manufacturing a magnetic head suspension assembly according to claim 1, wherein said step of cladding said electrically conductive metal thin film comprises vacuum deposition.

20. A method of manufacturing a magnetic head suspension assembly according to claim 1, wherein said step of cladding said electrically conductive metal thin film comprises ion plating.

* * * * *